(12) United States Patent
Baumbach et al.

(10) Patent No.: US 7,216,892 B2
(45) Date of Patent: May 15, 2007

(54) AIR BAG DOOR AND ATTACHMENT METHOD

(75) Inventors: Eric Baumbach, Sterling Heights, MI (US); Joseph Hillaker, Otisville, MI (US); Ravinder Mann, Utica, MI (US)

(73) Assignee: Key Safety Systems, Inc., Sterling Heights, MI (US)

( * ) Notice: Subject to any disclaimer, the term of this patent is extended or adjusted under 35 U.S.C. 154(b) by 347 days.

(21) Appl. No.: 10/921,617

(22) Filed: Aug. 20, 2004

(65) Prior Publication Data

US 2006/0038385 A1 Feb. 23, 2006

(51) Int. Cl.
*B60R 21/215* (2006.01)
*B60R 21/217* (2006.01)

(52) U.S. Cl. ............................... 280/728.2; 280/728.3; 403/353; 403/388

(58) Field of Classification Search ............. 280/728.2, 280/728.3; 403/291, 353, 388
See application file for complete search history.

(56) References Cited

U.S. PATENT DOCUMENTS

| | | | |
|---|---|---|---|
| 5,060,972 A * | 10/1991 | Satoh et al. ................. 280/732 |
| 5,062,663 A * | 11/1991 | Satoh ....................... 280/728.3 |
| 5,445,409 A | 8/1995 | Abramczyk et al. |
| 5,460,400 A | 10/1995 | Davidson |
| 5,520,410 A * | 5/1996 | Sun .......................... 280/728.3 |
| 5,556,126 A * | 9/1996 | Lee .......................... 280/728.3 |
| 5,597,176 A * | 1/1997 | Kikuchi ................... 280/728.2 |
| 5,653,461 A * | 8/1997 | Fischer .................... 280/728.3 |
| 5,741,024 A * | 4/1998 | Enders ..................... 280/728.3 |
| 5,788,269 A * | 8/1998 | Jakovski et al. ......... 280/728.2 |
| 5,829,777 A | 11/1998 | Sakurai et al. |
| 5,851,023 A | 12/1998 | Nagata et al. |
| 6,039,341 A * | 3/2000 | Doxey et al. ............. 280/728.2 |
| 6,126,191 A | 10/2000 | Pepperine et al. |
| 6,161,865 A * | 12/2000 | Rose et al. ............... 280/728.3 |
| 6,394,485 B1 | 5/2002 | Amamori |
| 6,419,261 B1 | 7/2002 | Ibe |
| 6,572,135 B2 * | 6/2003 | Lang ........................ 280/728.2 |
| 6,752,415 B2 * | 6/2004 | Nelson et al. ........... 280/728.2 |
| 6,942,244 B2 * | 9/2005 | Roychoudhury ......... 280/728.3 |
| 7,029,024 B2 * | 4/2006 | Baumbach ............... 280/728.2 |
| 2002/0024197 A1* | 2/2002 | Thomas et al. .......... 280/728.2 |
| 2005/0082794 A1* | 4/2005 | Geyer et al. ............. 280/728.2 |

FOREIGN PATENT DOCUMENTS

| EP | 0 810 127 A | 12/1997 |
|---|---|---|
| EP | 1 151 898 A | 11/2001 |

* cited by examiner

*Primary Examiner*—Paul N. Dickson
*Assistant Examiner*—Laura B. Freedman
(74) *Attorney, Agent, or Firm*—Lonnie Drayer

(57) ABSTRACT

An air bag module has an air bag housing with an opening for deploying the air bag. The opening is provided with the cover. A connector attaches the cover to the air bag housing. The connector has an aperture and a protrusion for engaging the aperture. The aperture is located on one of the air bag housing and the cover while the protrusion is located on the other of the air bag housing and the cover. The protrusion has a first portion, a second portion and a third portion. The first portion extends from a surface of one of the air bag housing and the cover while the second portion extends transversely from the first portion and the third portion extends transversely from the first portion.

14 Claims, 4 Drawing Sheets

AIR BAG DOOR AND ATTACHMENT METHOD

BACKGROUND OF THE INVENTION

This invention relates to an air bag module.

An air bag module for a vehicle typically has an air bag and an air bag inflator. The air bag and air bag inflator are located in an air bag housing, which is mounted to a part of the vehicle. The housing has an opening through which the air bag deploys. A cover is placed over this opening. The cover may have a tear seam that tears when the air bag inflates to allow the air bag to deploy through the torn cover of the housing.

The cover is usually attached to the housing by rivets, brackets or other complicated connection features. The connection feature must securely attach the cover to housing. Due to the complexity of these connection features, the attachment of the cover to the air bag housing is time consuming. In addition, these connection features make the removal of the cover from the housing difficult. Accordingly, servicing the air bag module may also take too much time.

Moreover, while the air bag module is installed as a unit in the vehicle, the housing is generally mounted to one point of the vehicle and the cover mounted to another point. Because the cover and the housing are attached at different points, it may be difficult to install the air bag module into the vehicle if these mounting points are not where they should be.

A need therefore exists for an air bag module that allows a quick and simple installation and/or removal of the air bag cover onto the air bag housing while providing sufficient tolerance to permit the air bag cover and the air bag housing to be mounted to the vehicle at different attachment points.

SUMMARY OF THE INVENTION

The present invention comprises an air bag module having an air bag housing with an opening for deploying an air bag. A cover covers the opening. To simplify installation and removal of the cover, the air bag module has a straightforward connector comprising an aperture and a protrusion. Preferably, the protrusion is on the air bag housing while the aperture is on the cover. The protrusion may have three portions. The first portion extends from a surface of the air bag housing. The second and third portions extend transversely from the first portion. The first portion is disposed in the aperture with the second and third portions retaining the aperture on the first portion. The aperture may be larger than the first portion to allow the cover to move relative to the air bag housing. In this way, the air bag module provides some flexibility to accommodate off specification attachment points while still securing the cover to the air bag housing in two different directions.

In addition, the aperture of the connector flexes between a larger size opening and a smaller size opening. By being flexible, the aperture of the cover may be stretched over the protrusion during installation. The aperture then returns to a smaller dimension to secure itself around the protrusion. To disconnect the aperture from the protrusion, the aperture is stretched to the larger dimension and then taken off the protrusion. This design greatly facilitates installation and removal of the cover from the air bag housing.

Hence, the air bag cover may have an aperture that is stretched over a protrusion on the air bag housing. Once the protrusion is placed in this aperture, the aperture is allowed to reduce in size to thereby secure the cover to the air bag housing. The present invention accordingly allows for the quick installation and removal of the cover and provides greater flexibility in the installation of the air bag module into the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE INVENTION

Figure 1:
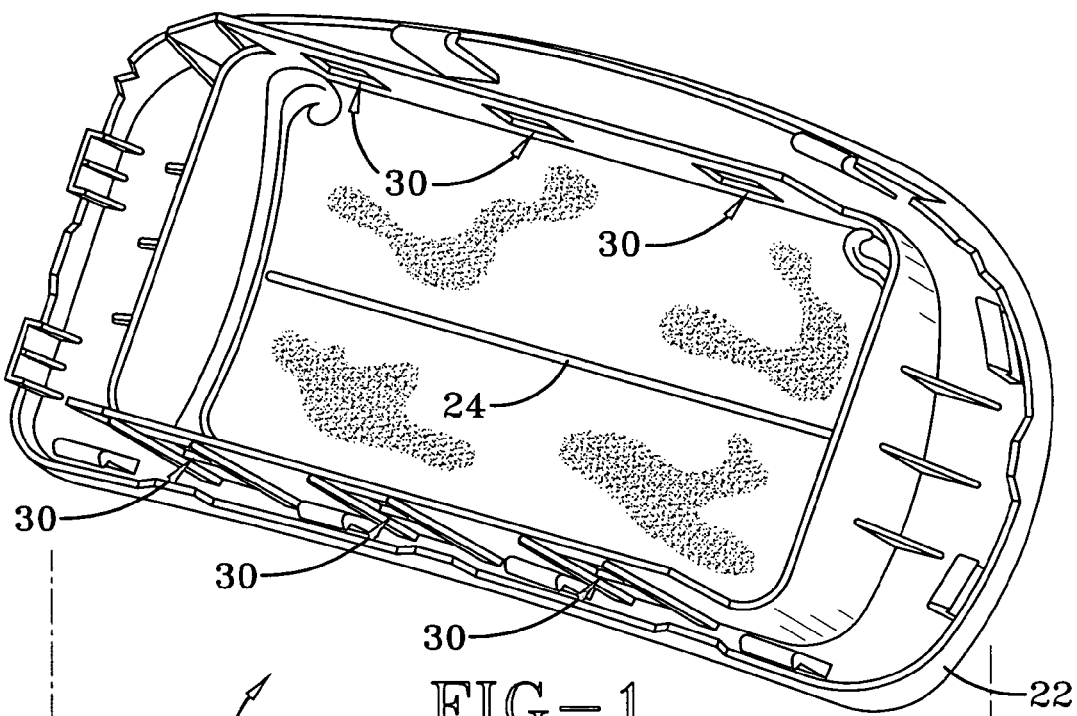
FIG. 1 illustrates a rear view of the air bag cover of the inventive air bag module.
Figure 2:
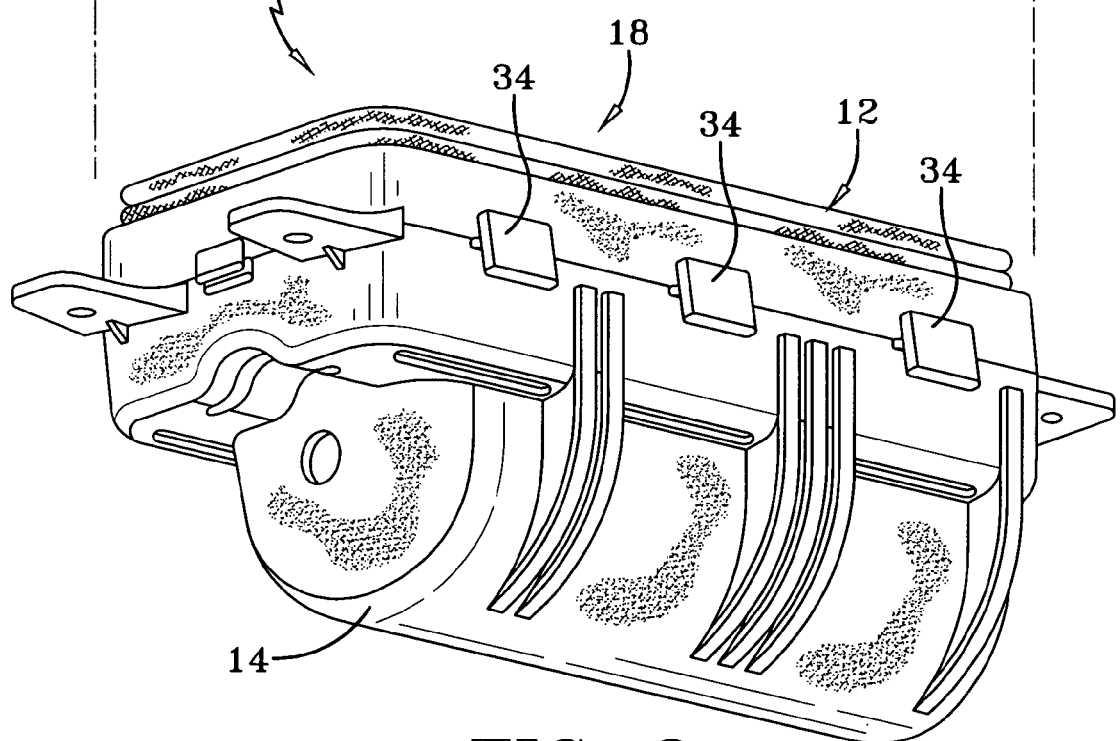
FIG. 2 illustrates a perspective side view of an air bag housing of the inventive air bag module.
Figure 3:
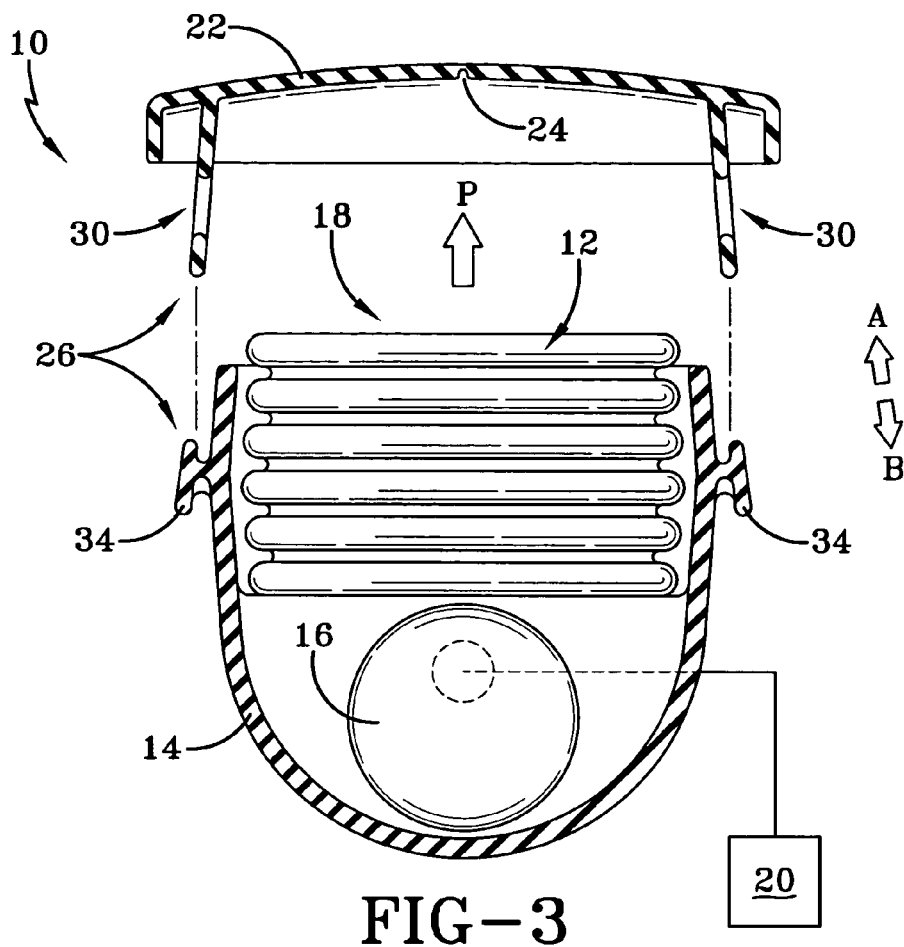
FIG. 3 illustrates a cross-sectional view of the installation of the air bag cover onto the air bag housing.
Figure 4:
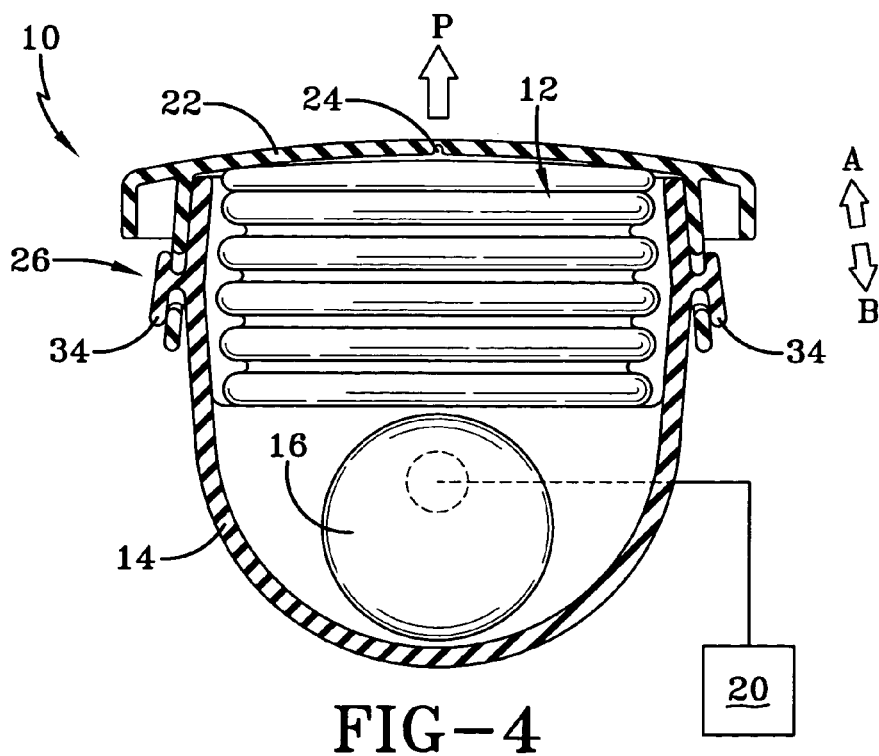
FIG. 4 illustrates the air bag cover installed on the air bag housing.

FIGS. 1–4 illustrate a view of the inventive air bag module 10. Air bag module 10 has an air bag cover 22 and an air bag housing 14. As shown in FIGS. 2–4, an air bag 12 is packed into the air bag housing 14. The air bag 12 is in communication with an air bag inflator 16, which is also disposed in the air bag housing 14. The air bag inflator 16 is controlled by a control unit 20 as known. Upon the detection of a vehicle crash of sufficient severity, air bag inflator 16 inflates the air bag 12 to cause its deployment in the direction of arrow P through an opening 18 of the air bag housing 14. As shown in FIGS. 1, 3 and 4, the air bag cover 22 has a tear seam 24 that allows the air bag 12 to pass through a tear of the air bag cover 22 during air bag deployment. These features of the invention are well known.

In the past, the air bag cover 22 was attached to the air bag housing 14 by complicated connectors, such as brackets or rivets. Although these type of connection features allow for a secure attachment of the air bag cover 22 to the air bag housing 14, these features make the installation of the air bag cover 22 on the air bag housing 14 time consuming. In addition, they do not facilitate the removal of the air bag cover 22 from the air bag housing 14. In contrast to existing designs, the inventive air bag module 10 uses a unique connector 26, which comprises an aperture 30 and a protrusion 34. The aperture 30 is preferably located on the air bag cover 22 as shown in FIGS. 1, 3 and 4 while the protrusions 34 are preferably located on the air bag housing 14. However, protrusions 34 may be placed on the air bag cover 22 with apertures 30 on the air bag housing 14 as well. Because the air bag cover 22 is made of a flexible material, such as a plastic, the apertures 30 may be made from the same material and also be flexible. The air bag housing 14 is generally hard so that protrusions 34 may be made from the same hard material. As will be seen, the apertures 30 may be stretched over the protrusions 34 to quickly install the air bag cover 22 onto the air bag housing 14.

As shown in FIG. 3, the air bag cover 22 is disposed over the opening 18 of the air bag housing 14. The apertures 30 are aligned with each respective protrusion 34. As shown in FIGS. 1 and 2, the air bag cover 22 has six apertures 30 while as shown in FIG. 2, the air bag housing 14 has six protrusions 34 to engage the six apertures 30. More or less apertures 30 and protrusions 34 may be provided to suit any particular application or size air bag module.

Figure 5:
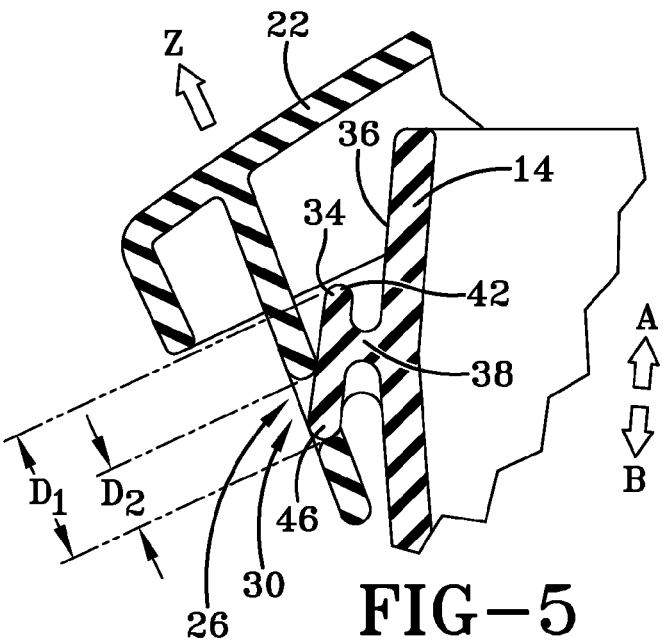
FIG. 5 illustrates a close up view of the connection feature shown in FIGS. 3 and 4.
Figure 6:
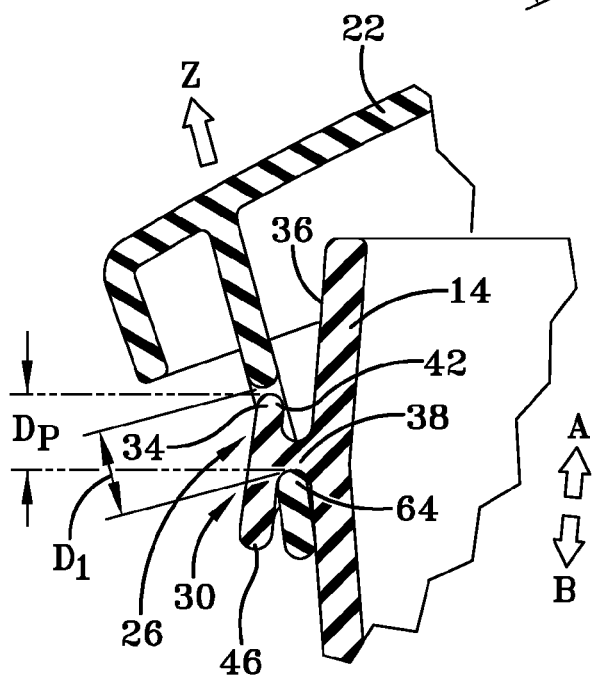
FIG. 6 illustrates a close up view of the connection feature of FIG. 5 with the aperture expanded to accommodate the protrusion.
Figure 7:
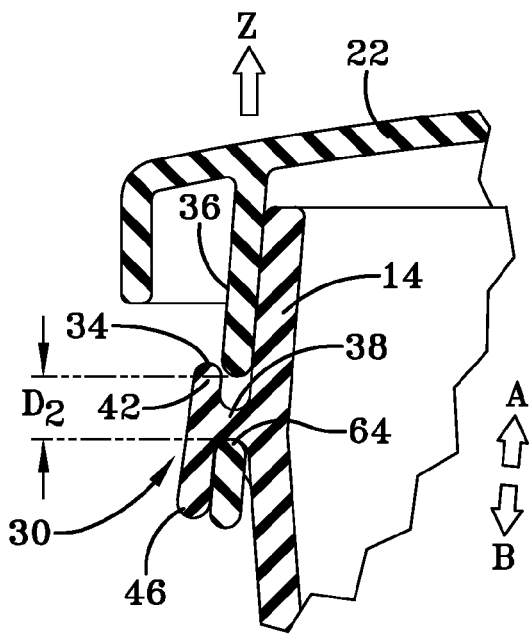
FIG. 7 illustrates the protrusion of FIG. 6 disposed in the aperture shown in FIGS. 5 and 6.

As shown in FIGS. 5–7, each protrusion 34 has three portions: first portion 38, second portion 42 and third portion 46. The first portion 38 extends perpendicularly from a surface 36 of the air bag housing 14. As shown in FIGS. 5–7, the second portion 42 extends transversely, here perpendicularly, in the direction of arrow A from the first portion 38. The third portion 46 extends transversely, say perpendicularly, from the first portion 38 in the direction of arrow B, a direction generally opposite to the direction of arrow A.

As shown in FIG. 5, to install the air bag cover 22 onto the air bag housing 14, the third portion 46 is disposed in the aperture 30. As shown, at this point, the aperture 30 has second aperture dimension $D_2$, which is the relaxed size of the aperture 30. As shown in FIG. 6, if the air bag cover 22 is pulled in the direction of arrow Z, a side of aperture 64 catches the protrusion 34 and the aperture 30 will stretch from dimension $D_2$ to a larger first aperture dimension $D_1$, which is the dimension in an unrelaxed condition. The first aperture dimension $D_1$ is a size larger than a protrusion dimension $D_p$, which happens to be the distance across the second portion 42 and the thickness T of the first portion 38. This is the minimum distance that the aperture 30 needs to expand to fit over the second portion 42 and the first portion 38.

As shown in FIG. 6, when cover 22 is pulled in the direction of arrow Z to this first aperture dimension $D_1$, the aperture 30 may clear the second portion 42 of the protrusion 34 to take the position shown in FIG. 7. At this point, the aperture 30, which is stretched and unrelaxed, may be allowed to relax and shrink to the second dimension $D_2$, which is preferably less than the dimension $D_p$. In this way, the aperture 30 is secured in the direction of both arrow A and arrow B.

Figure 8:
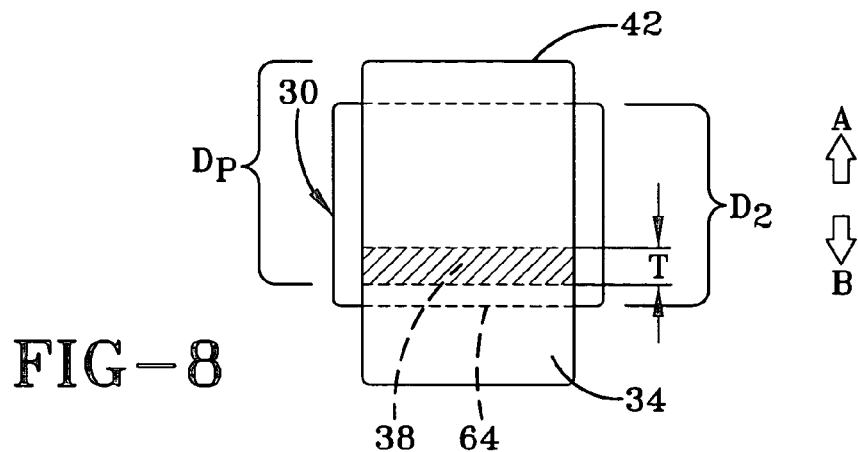
FIG. 8 illustrates a front view of the connection feature of FIGS. 5–7, highlighting the oversize nature of the aperture relative to a portion of the protrusion.
Figure 9:
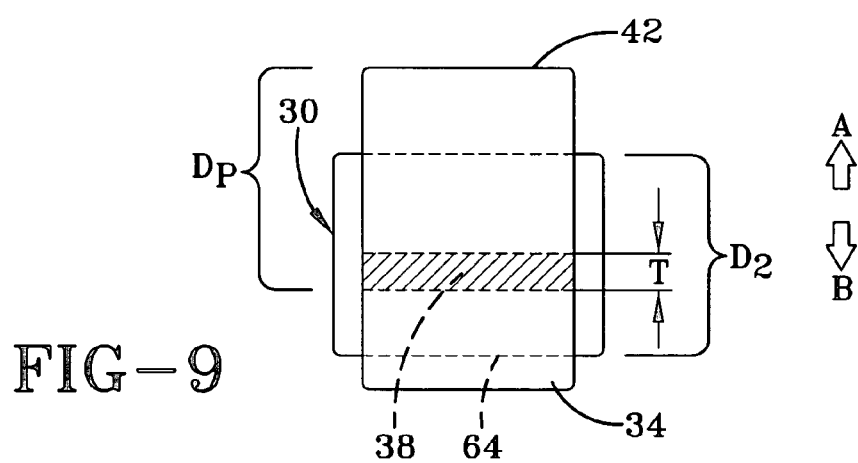
FIG. 9 illustrates a front view of the connection feature of FIGS. 5–8, showing room for movement of the protrusion within the aperture.

As shown in FIGS. 8–9, the second aperture dimension $D_2$ is preferably greater in size than thickness T of the first portion 38. In so doing, the aperture 30 and therefore the air bag cover 22 is allowed to have room to shift in the direction of either arrow A or B without causing the aperture 30 to disconnect from the protrusion 34. This design accordingly permits air bag cover 22 to move up and down relative to the air bag housing 14 without disconnecting the air bag cover 22 from the air bag housing 14. Because the air bag cover 22 is free to move to a certain degree relative to the air bag housing 14, the air bag cover 22 may be mounted with greater freedom at one location of a vehicle while the air bag housing 14 may be mounted to another location without detaching the air bag cover 22 from the air bag housing 14. That is, there is room to move the air bag housing 14 relative to the air bag cover 22 so as to facilitate installation of the air bag module 10 into the vehicle. In addition, this feature permits a number of the inventive air bag modules 22 to be stacked upon one another without causing the air bag cover 22 to disconnect from the air bag housing 14.

Figure 10:
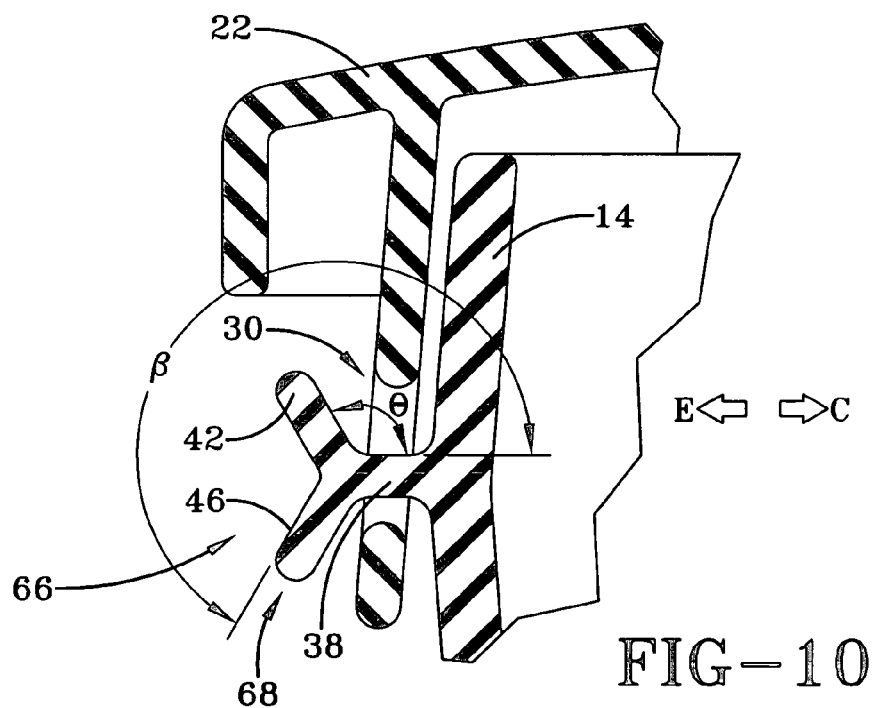
FIG. 10 illustrates a side view of an alternative version of the inventive connector.

FIG. 10 illustrates an alternative version of the inventive air bag connector 66. Here, the air bag connector 66 comprises an aperture 30 and a protrusion 68. The second protrusion 68 has a second portion 42 set at an angle θ relative to the first portion 38 while a third portion 46 is set at angle β, an angle greater than θ. This particular protrusion 68 permits a greater amount of freedom of movement of air bag cover 22 in the direction of either arrow E or in the direction of arrow C relative to the air bag housing 14.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. An air bag module comprising:
   an air bag housing having an opening for deploying an air bag in a first direction through the opening;
   a cover for covering said opening, said cover having a tear seam that allows said air bag to pass through the tear of the cover in the first direction;
   a connector for attaching said cover to said air bag housing, said connector having an aperture and a protrusion for engaging said aperture, said aperture on one of said air bag housing and said cover and said protrusion on the other of said air bag housing and said cover;
   wherein said protrusion has a first portion, a second portion and a third portion, said first portion extending perpendicularly from a surface of one of said air bag housing and said cover, said second portion extending transversely from said first portion, and said third portion extending transversely from said first portion; and
   wherein said aperture is flexible between a first aperture dimension and a second aperture dimension, said first aperture dimension larger than a protrusion dimension and said second aperture dimension smaller than said protrusion dimension, said protrusion dimension comprising a distance across one of said second portion and said third portion and a thickness of said first portion, said second aperture dimension being greater than said thickness of said first portion.

2. The air bag module of claim 1 wherein said second portion extends transversely from said first portion generally along a first direction and said third portion extends transversely from said first portion generally along a second direction different from said first direction.

3. The air bag module of claim 2 wherein said first direction is generally opposite to said second direction.

4. The air bag module of claim 1 wherein said second portion extends further from said first portion than said third portion.

5. The air bag module of claim 1 wherein said second portion extends from said first portion generally along a first angle and said third portion extends from said first portion generally along a second angle different than said first angle.

6. The air bag module of claim 1 including an air bag disposed in said air bag housing.

7. The air bag module of claim 1 including an air bag inflator disposed in said air bag housing.

8. The air bag module of claim 1 wherein a side of said aperture contacts said first portion when said protrusion is engaged to said aperture.

9. An air bag module comprising:
an air bag housing having an opening for deploying an air bag in a first direction through the opening;
a cover for covering said opening, said cover having a tear seam that allows said air bag to pass through the tear of the cover in the first direction;
a connector for attaching said cover to said air bag housing, said connector having an aperture and a protrusion for engaging said aperture, said aperture on one of said air bag housing and said cover and said protrusion on the other of said air bag housing and said cover, wherein said protrusion has a first portion, a second portion and a third portion, said first portion extending perpendicularly from a surface of one of said air bag housing and said cover, said second portion extending transversely from said first portion, and said third portion extending transversely from said first portion; and
wherein said aperture is flexible between a first aperture dimension and a second aperture dimension, said first aperture dimension larger than a protrusion dimension and said second aperture dimension smaller than said protrusion dimension, wherein said protrusion dimension comprising a distance across one of said second portion and said third portion and a thickness of said first portion and said second aperture dimension is greater than said thickness of said first portion.

10. The air bag module of claim 9 including an air bag disposed in said air bag housing.

11. The air bag module of claim 9 including an air bag inflator disposed in said air bag housing.

12. A method of assembling an air bag module having an air bag cover and an air bag housing having an opening for deploying an air bag in a first direction through the opening and a tear in the cover upon deployment, the method comprising the steps of:
expanding an aperture on the air bag cover to a first aperture dimension from a second aperture dimension, the first aperture dimension larger than the second aperture dimension;
disposing a protrusion on the air bag housing in the aperture while in the first aperture dimension, the protrusion having a first portion extending transverse to the first direction and perpendicularly relative to a surface of the air bag housing; and
reducing the aperture to the second aperture dimension while the protrusion is disposed in the aperture.

13. The method of claim 12 wherein the protrusion has a protrusion dimension, the first aperture dimension larger than the protrusion dimension and the second aperture smaller than the protrusion dimension.

14. The method of claim 12 wherein the aperture flexes between the first aperture dimension and the second aperture dimension, the aperture in a relatively relaxed condition when in the second aperture dimension and a relative unrelaxed condition when in the first aperture dimension.

* * * * *